(12) United States Patent
Ganapathy et al.

(10) Patent No.: US 11,510,279 B2
(45) Date of Patent: Nov. 22, 2022

(54) SYSTEM AND METHOD FOR SELECTING A PATH IN A COMMUNICATION NETWORK

(71) Applicant: Qubercomm Technologies, Inc., Walnut, CA (US)

(72) Inventors: Srinivasan Ganapathy, Chennai (IN); Kirthik Srinivasan, Chennai (IN); Sukumar Puvvala, Chennai (IN)

(*) Notice: Subject to any disclaimer, the term of this patent is extended or adjusted under 35 U.S.C. 154(b) by 179 days.

(21) Appl. No.: 16/874,332

(22) Filed: May 14, 2020

(65) Prior Publication Data
US 2020/0383170 A1    Dec. 3, 2020

(30) Foreign Application Priority Data

May 14, 2019    (IN) .............................. 201921014721

(51) Int. Cl.
*H04W 84/18*    (2009.01)
*H04W 8/00*    (2009.01)
*H04W 24/08*    (2009.01)
*H04W 40/24*    (2009.01)

(52) U.S. Cl.
CPC ........... *H04W 84/18* (2013.01); *H04W 8/005* (2013.01); *H04W 24/08* (2013.01); *H04W 40/244* (2013.01); *H04W 40/246* (2013.01)

(58) Field of Classification Search
CPC ..... H04W 84/18; H04W 8/005; H04W 24/08; H04W 40/244; H04W 40/246; H04W 48/16; H04W 84/12; H04L 45/124
See application file for complete search history.

(56) References Cited

U.S. PATENT DOCUMENTS

| | | | |
|---|---|---|---|
| 2005/0066052 A1* | 3/2005 | Gupta | H04L 45/124 709/238 |
| 2006/0140111 A1* | 6/2006 | Vasseur | H04L 45/02 370/216 |
| 2010/0246480 A1* | 9/2010 | Aggarwal | H04L 45/123 370/328 |
| 2017/0078186 A1* | 3/2017 | Thyni | H04L 45/24 |

* cited by examiner

*Primary Examiner* — Peter P Chau
(74) *Attorney, Agent, or Firm* — Buchalter; Jason W. Croft

(57) ABSTRACT

Disclosed is a method for selecting a path in a communication network. The method comprises transmitting, through a device connected to a target node, a beacon, to one or more nodes in the communication network. The beacon comprises a set of informative parameters. The method comprises calculating, by each node, a selective score towards one more paths to be selected for reaching the target node in the communication network. The method further comprises identifying, by each node, a target path from the one or more path. The target path is a path having a highest value of the selective score as compared to selective score for other paths in the one or more paths. The method further comprises selecting, by each node, the target path from the one or more paths for reaching the target node.

29 Claims, 10 Drawing Sheets

SYSTEM AND METHOD FOR SELECTING A PATH IN A COMMUNICATION NETWORK

CROSS-REFERENCE TO RELATED APPLICATIONS AND PRIORITY

The present application claims priority to Indian Patent Application No. 201921014721 filed on May 14, 2019, the entity of which is hereby incorporated by reference.

TECHNICAL FIELD

The present subject matter described herein, in general, relates to field of communication networks, and more particularly to a system and a method for selecting a path in a communication network.

BACKGROUND

Now a days, with recent advances in Wi-Fi® technology, specifically because of ease of implementation and ability to meet the requirements of a majority of connectivity use cases; the Wi-Fi connection has become one of a dominant wireless solution.

Continuous progress in the wireless technology has propelled successful penetration of the wireless technology in a variety of applications. So, it also became a highly requested connectivity solution in large-scale use cases for which it was not originally developed.

Typically, the wireless networks became more complicated with sophisticated structures in which the regular access point (AP)-based topology appeared to be a less efficient solution. The requirement of constructing mesh networks in which more than one hop will be used, has enforced the IEEE organization to compose the IEEE Std.

Generally, a mesh network can be used for a wide variety of scenarios, outside of the basic capability to transfer data over a distributed deployment and path selection is the core algorithm of the mesh network. The mesh network can make the network performance great or unusable.

SUMMARY

Before the present systems and methods for selecting a path in a communication network, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular implementations or versions or embodiments only, and is not intended to limit the scope of the present application. This summary is provided to introduce aspects related to a system and a method for selecting a path in a communication network. This summary is not intended to identify essential features of the claimed subject matter nor is it intended for use in determining or limiting the scope of the claimed subject matter.

In one implementation, a method for selecting a path in a communication network is disclosed. The method may comprise transmitting, through a device connected to a target node, a beacon, to one or more nodes in the communication network. The beacon may comprise a set of informative parameters. The method may further comprise calculating, by each node, a selective score towards one more paths to be selected for reaching the target node in the communication network. The selective score may comprise a dynamic score for each parameter in the set of informative parameters. The method may further comprise identifying, by each node, a target path from the one or more paths. The target path may be a path having a highest value of the selective score as compared to selective score for other paths in the one or more paths. The method may further comprise selecting, by each node, the target path from the one or more paths for reaching the target node.

In another implementation, a system for selecting a path in a communication network is disclosed. The system may comprise a device connected to a target node, for transmitting a beacon, to one or more nodes in the communication network. The beacon may comprise a set of informative parameters. Further, the system may comprise the one or more nodes in the communication network. Each node may be configured to calculate a selective score towards one more paths to be selected for reaching the target node in the communication network. The selective score may comprise a dynamic score for each parameter in the set of informative parameters. Each node may further identify a target path from the one or more paths. The target path is a path having a highest value of the selective score as compared to selective score for other paths in the one or more paths. Each node may further select the target path from the one or more paths for reaching the target node.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Figure 1:
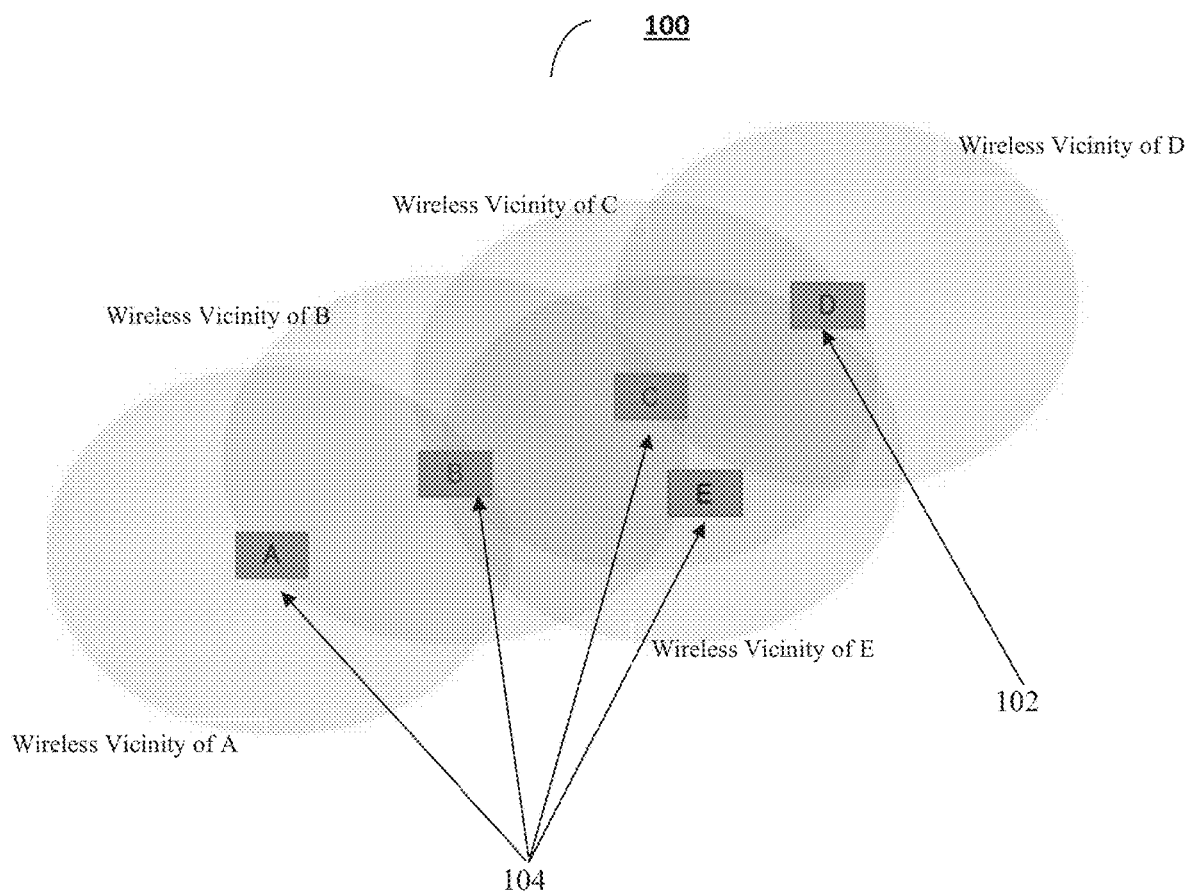
FIG. 1 illustrates a method 100 for selecting a path in a communication network, in accordance with an embodiment of the present subject matter.

Some embodiments of this disclosure, illustrating all its features, may now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods for selecting a path in a communication network, similar or equivalent to those described herein can be used in the practice or testing of embodiments of the present disclosure, the exemplary, systems and methods for selecting a path in a communication network are now described. The disclosed embodiments for selecting a path in a communication network, are merely examples of the disclosure, which may be embodied in various forms.

Various modifications to the embodiment may be readily apparent to those skilled in the art and the generic principles herein may be applied to other embodiments for path selection. However, one of ordinary skill in the art may readily recognize that the present disclosure for selecting a path in a communication network is not intended to be limited to the embodiments described, but is to be accorded the widest scope consistent with the principles and features described herein.

The conventional systems with broadcast based mesh network may lead to an exponential increase in airtime penalty. The conventional systems may rely on broadcast based discovery. Thus, discovery broadcast frame penalty may be exponentially higher with higher number of nodes. Further, in the conventional systems, each node in the network may need to identify the best node for every destination using special path detection frames, leading to additional airtime overhead for path finding. Further, in the conventional systems, path adaptation may be distance specific. Also, there may be a requirement of "request" and "response" from all the alternative paths to converge on the best found path, leading to high path adaptation latency. Further, the conventional systems may generally consider network metrics within a given network for path selection, which may not be sufficient to accurately select the optimum path. In addition, the conventional systems may not consider a multi-backhaul aspect while selecting the optimum path.

The present matter overcomes the above-mentioned problems with the conventional systems. The present subject matter is related to a method for selecting a path in a communication network is disclosed. The method may comprise transmitting, through a device connected to a target node, a beacon, to one or more nodes in the communication network. The beacon may comprise a set of informative parameters. The method may further comprise calculating, by each node, a selective score towards one more paths to be selected for reaching the target node in the communication network. The selective score may comprise a dynamic score for each parameter in the set of informative parameters. The method may further comprise identifying, by each node, a target path from the one or more paths. The target path may be a path having a highest value of the selective score as compared to selective score for other paths in the one or more paths. The method may further comprise selecting, by each node, the target path from the one or more paths for reaching the target node.

In the method proposed by the present subject matter, the beacons may comprise metric information for each network node. Further, there may be an airtime penalty for each device transmitting the metric information over the air. With increase in the number of nodes, the airtime penalty may increase only by few bytes per node. Thus, there is only a linear increase in airtime penalty, unlike the conventional systems with exponential increase.

Further, in the proposed method, every node may advertise only the best/optimum path with corresponding throughput estimate and device score. Hence, there is no additional airtime overhead for path finding, unlike the conventional systems.

Further, the proposed method is based on network depth. Considering if the network depth is 3, irrespective of the number of nodes, it may take 3 times beacon-interval. For 100 ms beacon interval, it may take max 300 ms to adapt for new path between any nodes. In addition, in the proposed method, path adaptation is beacon based. Hence, unlike conventional systems, there is no need for destination specific frames transmission/reception for best path adaptation. Thus, the path adaptation latency is low in the proposed method.

Furthermore, the proposed method utilizes network metrics, device metrics, and application metrics for selecting the optimum path in the communication network. For network metrics, one or more parameters such as RSSI, noise floor, capabilities of both the nodes, radio load at given point, channel busyness at given point may be considered to calculate end-to-end best/optimum path over multiple hops in the communication network, leading to accuracy in selecting the optimum path. In addition, the proposed method also considers multi-backhaul aspect for path selection, unlike the conventional systems. It is to be noted that the proposed method may lead to an overall improvement in path selection.

In accordance with an embodiment, referring now to FIG. 1, a method 100 for selecting a path in a communication network is described.

In one embodiment, the communication network may be a mesh network. The mesh network may comprise one or more nodes 104 connected to one or more other nodes for communication. The one or more nodes 104 may comprise one or more intermediate nodes 104 and a target node 102. The one or more intermediate nodes 104 may be required to reach the target node 102 based on selecting an optimum path (may also be simply referred as the path).

Each node 104 may have a device connected to it. A beacon may be transmitted by the device connected to the target node 102, to one or more nodes 104 in the communication network. The beacon may comprise a set of informative parameters. The set of informative parameters may comprise at least one of an address of the target node 102 (6 bytes), estimated throughput to reach the target node 102 (2 bytes), device score of the nodes (1 byte), capability of the target node 102 (1 byte), and next hop node address towards the target node 102 (6 bytes). Each node may advertise the one or more parameters to reach the target node 102. In one example, if there are 10 nodes in the mesh network, then each device's beacon will have the above set of 16 bytes advertised for each of the other 9 devices.

The set of informative parameters may further comprise if the device is operated through one of a battery or mains power, remaining battery minutes in case the device is operated by the battery, charge status of the battery of the device, current free CPU percentage for the device, current free memory percentage for the device.

In one embodiment, the set of informative parameters may comprise a link type effect due to multi-backhaul links between two or more nodes in the communication network. The multi-backhaul links may indicate a combination of backhaul links, comprising one or more of wired links, wireless links.

Upon receiving the beacon from the device connected to the target node 102, each node 104 may calculate a selective score towards one more paths to be selected for reaching the target node 102 in the communication network. The selective score may comprise a dynamic score for each parameter in the set of informative parameters. The calculating may be performed by using at least one of a device metrics, network metrics, and application metrics.

The capability of the target node 102 may be determined based on Received Signal Strength Indicator (RSSI) value associated with the beacon received from the device.

The device metrics may indicate the device score. The device metrics may comprise one or more of remaining battery time, current free CPU percentage, current free memory associated with the device.

Further, the network metrics may indicate a network score. The network metrics may comprise one or more of a Packet Error Rate (PER) associated with each path from the one or more paths, number of mesh hops required to reach the target node 102, current traffic load on one or more hop nodes, channel noise floor, and network latency.

The application metrics may indicate an application score used for calculating the selective score. The application metrics may comprise a type of application.

The selective score may comprise at least one of the device score, the network score, and the application score. The selective score may be computed based on adding at least two of the device score, the network score, and the application score.

In one embodiment, the selective score may computed by dynamically assigning one or more weights to each of the device score, the network score, and the application score based on one or more environmental factors using machine learning technique.

In one implementation, a weighted-score method as part of the method 100 may be used to select the optimum path from the one or more paths. In one example, the weighted score method may be 70%(=network weight) of network score+30% (=device weight) of device score=final selective score. In other example weighted score method may be 70%(=network weight) of network score+20% (=device weight) of device score+10% (=App Weight) of App Score=final selective score.

In one example of the implementation, the metric calculation may be dynamically adaptable such as the weights may keep on changing based on environmental factors (use machine learning & Artificial Intelligence (AI)). Further, a centralized weight table (same weights across nodes) and prioritize metrics may be maintained that shows difference for example, in one case when throughput claimed to the target node 102 is same for two paths, a higher weight is assigned for device score to decide the optimum path. In another case, when network score is nearly the same for two paths, a higher weight may be assigned for device score to decide the optimum path.

In one example of the present subject matter, machine-learning (ML) patterns may be used to keep adapting to the right weight for each score and derive patterns. Further, the weights may be modified based on the patterns, for example, in one case when battery is getting charged, there is a very less probability of the mesh going down due to power. The target node 102 may claim full battery score: thus, network weight is increased here to find differentiation. In another case, when there is likelihood of mesh nodes used for gaming in the evenings (kids play after school hours), learn it. Thus, other nodes can avoid this gaming node as route.

In one implementation, when the target node 102 is in wireless vicinity i.e. the target node 102 is mesh connected, the beacon may be received from the device connected to the target node 102 and the selective score may be calculated directly from one or more beacon parameters associated with the target node 102. The one or more beacon parameters may comprise current snapshot of battery of the device, CPU, memory and from the RSSI of the neighbour beacon.

In another implementation, when the target node 102 is not in wireless vicinity, the one or more nodes 104 may rely on the set of informative parameters (16 bytes) shared by neighbour nodes, in order to calculate the selective score.

In this case, the calculating may comprise searching, by each node 204, the address of the target node 202 in the communication network matching with a target address based on the set of informative parameters. Further, an end-to-end throughput value may be calculated by the node, in case of the matching. Furthermore, the selective score may be calculated by using the end-to-end throughput value. In one embodiment, the present subject matter provides selective score and end-to-end throughput calculation for a multi-hop path in the communication network.

Further, upon calculating the selective score, each node may identify a target path from the one or more paths for reaching the target node 202. The target path may be a path having a highest value of the selective score as compared to selective score for other paths in the one or more paths.

Further, the target path may be selected by the node for reaching the target node 202.

In one embodiment, the path may be dynamically selected in case of moving nodes.

Figure 2:
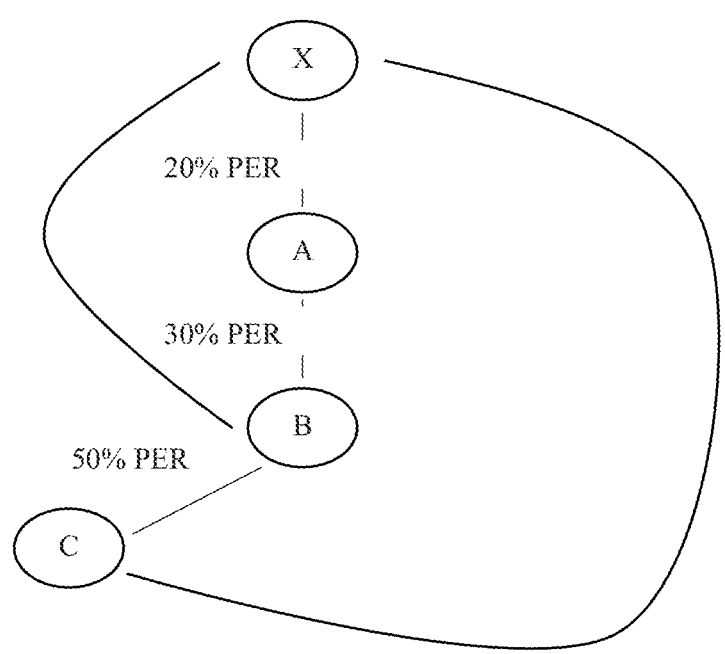
FIG. 2 illustrates computation of end-to-end throughput in the method 100 for selecting the path in the communication network, in accordance with an embodiment of the present subject matter.

In accordance with an embodiment, referring now to FIG. 2, the method for computing the end-to-end throughput for selecting the path, is described, in accordance with an embodiment of the present subject matter.

In one exemplary embodiment for Packet error Rate (PER) calculation, consider that node A transmits a beacon to node B in the communication network. The radio capability of node and node B is 866 Mps. Further, an RSSI value of the received beacon is −45 dBm, noise floor at B is −90 dBm, radio load occupancy percentage at B is 80%, channel busyness percentage at B is 75%. Thus, a prorate for RSSI using radio capability, RSSI, and noise floor is calculated as:

Signal to noise ratio(SNR)=signal RSSI−noise floor=−45−(−90)=45

Further, the below table may be used to determine "link estimate". The indexes from 0 to 60 in the below table indicate the SNR, and the values at the indexes indicate the link estimate.

| |
|---|
| 0.1, 0.2, 0.3, 0.4, 0.5, /* 0 */ |
| 0.6, 0.7, 0.8, 0.9, 1.0, /* 5 */ |
| 1.2, 1.4, 1.6, 1.8, 2.0, /* 10 */ |
| 2.5, 3.5, 4.5, 5.5, 6.5, /* 15 */ |
| 8.0, 10.0, 12.0, 14.0, 16.0, /* 20 */ |
| 18.0, 21.4, 24.8, 28.2, 31.6, /* 25 */ |
| 35.0, 37.0, 39.0, 41.0, 43.0, /* 30 */ |
| 45.0, 48.0, 51.0, 54.0, 57.0, /* 35 */ |
| 60.0, 62.0, 64.0, 66.0, 68.0, /* 40 */ |
| 70.0, 73.0, 76.0, 79.0, 82.0, /* 45 */ |
| 85.0, 87.2, 89.4, 91.6, 93.8, /* 50 */ |
| 96.0, 96.6, 97.2, 97.8, 98.4, /* 55 */ |
| 99.0 /* 60 */ |

Thus, value at index 45 is 70. Hence, link estimate is 70% (it changes for a different RSSI and/or different noise floor). Further, prorate for RSSI is 866*70/100=606.2 Mbps.

Further, in another example for computing end-to-end throughput, one or more nodes such as, node X, node A, node B, and node C are connected as shown in the FIG. 2. The physical radio node capability is 866 M. The Packet error Rate (PER) is 20% from node A to the node X derived from a Received Signal Strength Indicator (RSSI) value (considering above example). The throughput from the node A to the node X is 866*(100−20)%=866*0.8=692.8 Mbps.

Similarly, the Packet error Rate (PER) is 30% from the node B to the node A. The throughput from the node B to the node A is 866*0.7=606.2 Mbps.

Similarly, the Packet error Rate (PER) is 50% from the node C to the node B. The throughput from the node C to the node B is 866*0.5=433 Mbps.

Since, minimum of path BA and path AX is path BA and throughput associated with path BA is 606.2, thus, time taken from B to X to transmit 606.2 Mb=606.2/606.2+606.2/692.8=1+0.875=1.875 s. Further, end-end throughput or B to X per second Mb=606.2/1.875=323.3.

Further, since, minimum of path CB and path BX is path BX and throughput associated with BX is 323.3, thus, time taken for C to X to transmit 323.3 Mb=323.3/323.3+323.3/433=1+0.74665127=1.74665127 s. Further, end-end throughput or C to X per second Mb=323.3/1.74665127=185.

Figure 3:
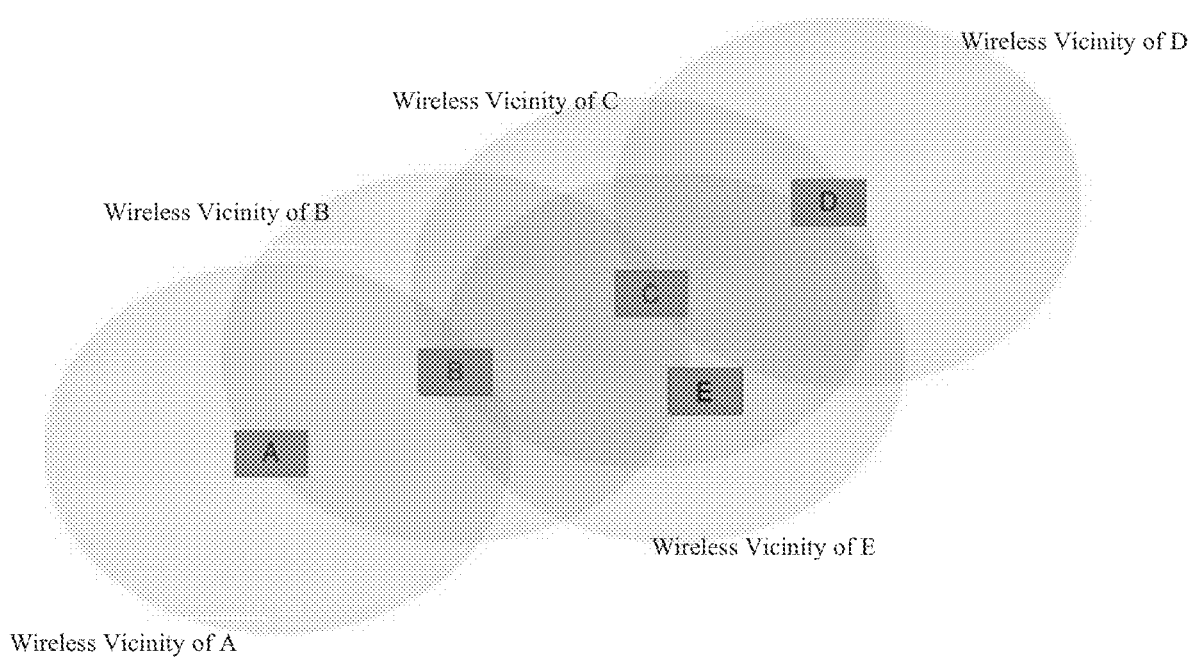
FIG. 3 illustrates an example of the method 100 for selecting a path in a communication network in case of neighbour node, in accordance with an embodiment of the present subject matter.

Referring now to FIG. 3, an example of the method 100 for selecting the path in communication network in case of a neighbour node, is described in accordance with an embodiment of the present subject matter.

In the example, five devices connected with each of the five nodes (node A, node B, node C, node D, and node E) are shown. Further, a wireless vicinity of each of the devices is displayed.

In the example of path selection, node B is advertising path to the node A, wherein the node A is a neighbour node. Node A transmits a beacon, and only node B receives the beacon. Further, in next beacon, node B adds one or more parameters such as "estimated throughput (throughput) to reach node A", "device score of node A as seen by node B", "capabilities of node A" based on RSSI value associated with the beacon received from node A, and one or more system parameters. Further, node B may reach node C and may also reach node E. Node B need not always reach node C directly, or node E directly. Though, in wireless vicinity, node B may still reach the node E via node C.

Figure 4:
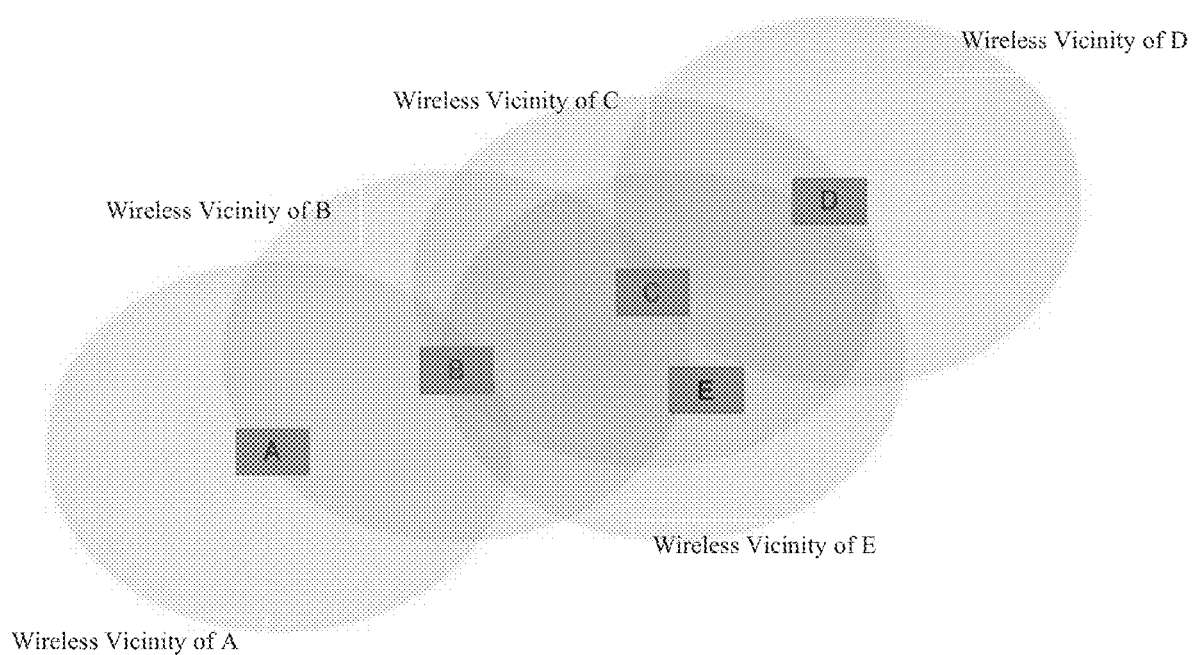
FIG. 4 illustrates an example of the method 100 for selecting a path in a communication network in case of non-neighbour node, in accordance with an embodiment of the present subject matter.

Referring now to FIG. 4, an example of the method 100 for selecting the path in communication network in case of a non-neighbour node, is described in accordance with an embodiment of the present subject matter.

In the example, five devices associated with each of the five nodes (node A, node B, node C, node D, and node E) are shown. Further, a wireless vicinity of each of the devices is displayed. Further, in the example of path selection, node B is detecting best path to reach a target node D (non-neighbour node). In the first step, node D transmits a beacon. Further, the beacon is received by both nodes C and E.

The beacon comprises a set of informative parameters. Further, in node C's next beacon, it adds the set of informative parameters such as "estimated throughput to reach node D", "device score of node D as seen by node C", "capabilities of node D" based on RSSI value associated with the beacon received from node D, and one or more system parameters.

Similarly, in node E's next beacon, it adds the set of informative parameters such as "estimated throughput to reach node D", "device score of node D as seen by node E", "capabilities of node D" based on RSSI value associated with the beacon received from node D, and one or more system parameters. Further, node B receives one or more beacons from both nodes C and E. Further, B needs to make a choice between nodes C and E to reach node D.

Thus, node B calculates selective score for each path BCD and BED, based on the set of informative parameters associated with the beacons received from nodes C and E. Further, node B identifies a target path from either BCD or BED based on the selective score. The target path indicates the path having a highest value of the selective score. Further, node B stores the target path as the path-to reach the target node D. Furthermore, in its next beacon, node B advertises path-parameters to reach node D, based on the target path (optimum) selected. It is to be noted that the evaluation may happen for every beacon received to ensure path selection happens real-time.

Figure 5:
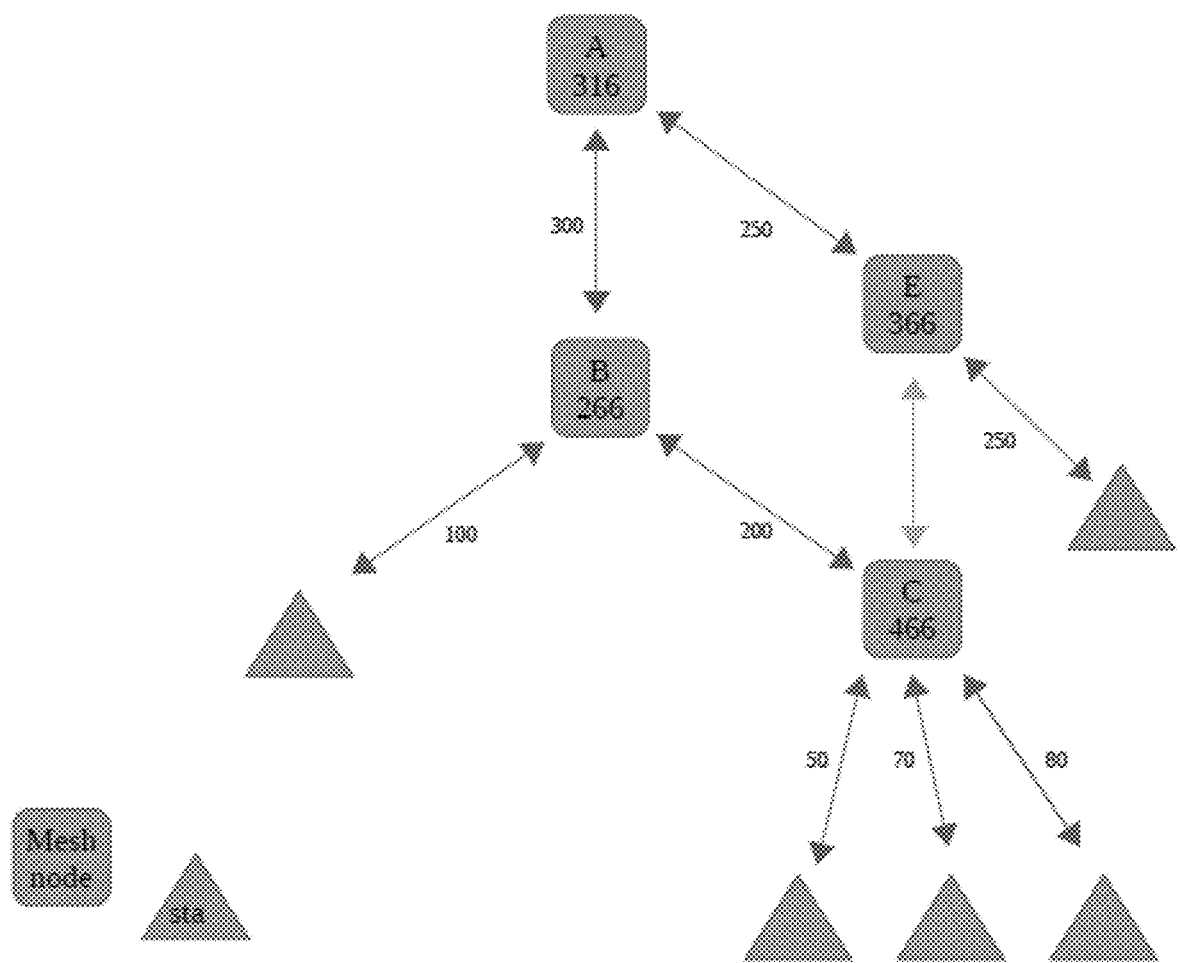
FIG. 5 illustratesa solution in the method 100 for a path selection problem due to load in the communication network, in accordance with an embodiment of the present subject matter.

Referring now to FIG. 5, a solution for a path selection problem due to load in the communication network is described, in accordance with an embodiment of the present subject matter.

In one embodiment, an example for path selection problem due to load is illustrated. The example comprises one or more mesh nodes named as node A, node B, node C, and node E and one or more mesh stations. In one implementation, consider a Signal-to-noise Ratio (SNR) value for each path is greater than 60. The node C has an option to reach the node A (target node) through one of the node B or the node E. Further, bandwidth associated with node C is 466 Mbps, node B is 266 Mbps and E is 366 Mbps.

Further, the end-to-end throughput for path CEA is computed by a division formula as represented below.

$$\min(CE,EA)/(1+\min(CE,EA)/\max(CE,EA))=(316/(1+(316/366))=169M.$$

Similarly, the end-to-end throughput for path CBA is =(266/(1+(266/316))=144 M. Thus, node C selects node E as the optimum path to reach node A, as the end-to-end throughput of the path CEA is greater than the path CBA. Once switched, the free bandwidth associated with node B becomes 666 M and with E becomes ~0 M. Thus, after some time, node C switches node B to reach the target node A. The process of selection is repeated and thus leads to problems in selecting the optimum path.

The present subject matter provides a solution to the above problem of repeating. When calculating the throughput for path CBA, the load on node B due to node C is two-fold on either directions. That is CB is 200 M, BA is 200 M (due to C). Overall load on node B is (266+200+200)=666 M. The load on node B indicates an amount of traffic or incoming data associated with the node B. However, node C may have few problems firstly, node C can only know it's traffic volume until node B. After node B, node C is not sure whether the same medium is used by node B to node A. In addition, secondly, node C does not know the destinations for the traffic routed to node B. It may be only node A or to a group of nodes through B. Thus, node C may not find out what portion of CB goes to BA. Hence, the short-term solution is to account only CB bytes in computing throughput for CBA.

Based on the proposed technique, CBA is 188 M i.e. (316/(1+(316/466))). However, in other scenario, the CBA should have been 214 M(316/(1+(316/666)) considering B as 666 M), CEA is 169 M(316/1+(316/366)). In view of this, the path switch would not happen.

Further, computation of radio load may be explained considering the example disclosed above in paragraph [0046], wherein node A transmits a beacon to node B. Here, the radio load occupancy percentage at node B is 80%, thus, free percentage is 20%. Also, prorated RSSI is 606.2 Mbps (as computed above). Thus, prorate for radio load may be computed as:

Prorated RSSI*free percentage=606.2*20/100=121.24 Mbps

Further, the channel busyness percentage at node B is 75%, thus free channel time is 25%. Thus, a prorate for channel busyness may be computed as:

Prorated radio load*free channel time=121.24*25/100=30.31 Mbps

Referring now to FIG. 6 A, a computation of bandwidth offer in the method 100 with multi-backhaul links in a mesh network is described in accordance with an embodiment of the present subject matter.

Referring now to FIG. 6 B, a use case for multi-backhaul links in case of no sharing of medium in the method 100 is described in accordance with an embodiment of the present subject matter.

Figure 6A:
FIG. 6A illustrates a computation of bandwidth offer in the method 100 with multi-backhaul links in a mesh network, in accordance with an embodiment of the present subject matter.
Figure 6B:
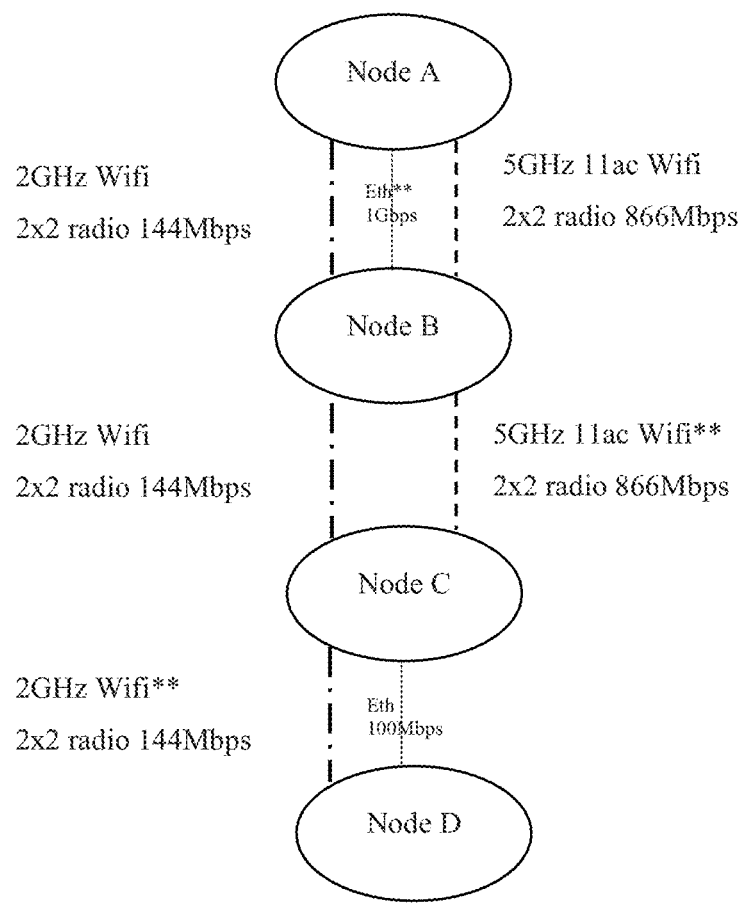
FIG. 6B illustrates a use case for multi-backhaul links in case of no sharing of medium in the method 100, in accordance with an embodiment of the present subject matter.
Figure 6C:
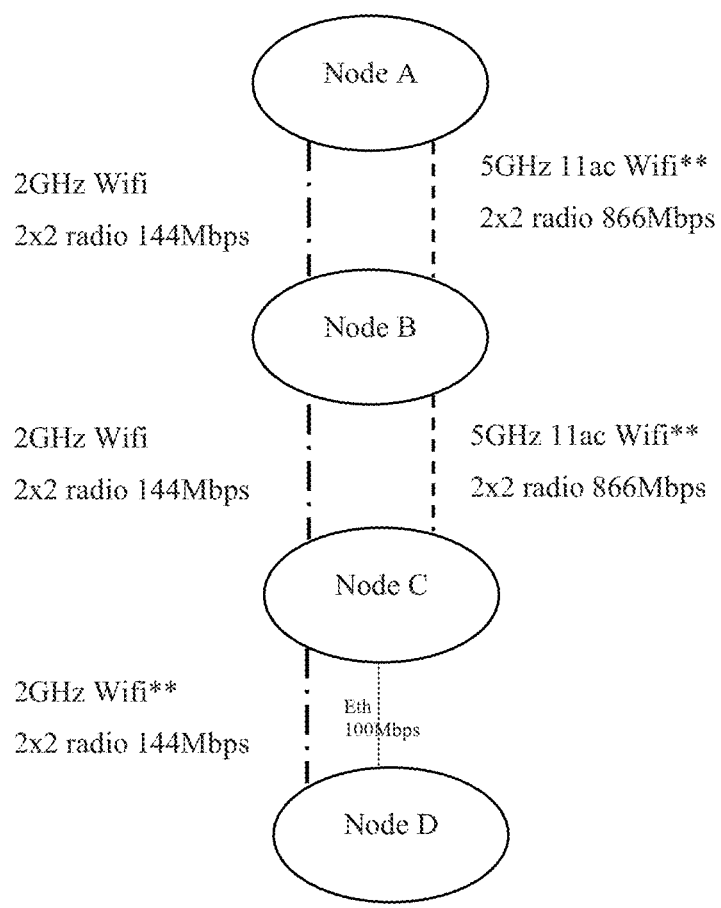
FIG. 6C illustrates a use case for multi-backhaul links in case of partial sharing of medium in the method 100, in accordance with an embodiment of the present subject matter.

Referring now to FIG. 6C, a use case for multi-backhaul links in case of partial sharing of medium in the method 100 is described in accordance with an embodiment of the present subject matter.

Figure 6D:
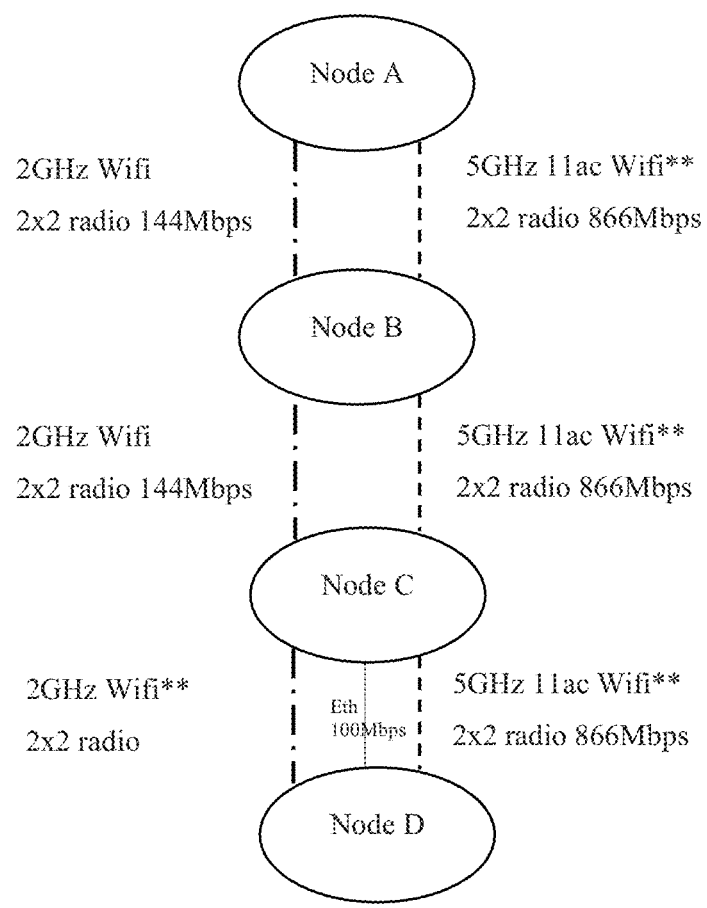
FIG. 6D illustrates a use case for multi-backhaul links in case of full sharing of medium in the method 100, in accordance with an embodiment of the present subject matter.

Referring now to FIG. 6D, a use case for multi-backhaul links in case of full sharing of medium in the method 100 is described in accordance with an embodiment of the present subject matter.

Further, the FIGS. 6A, 6B, 6C, and 6D are explained in combination below.

The multi-backhaul links may comprise a combination of backhaul links such as one or more of wired links, wireless links. Any possible combination of grouping of the multi-backhaul links may be possible to reach the target node. The link type may have an effect on bandwidth offer, offered by the one or more nodes.

In one case-link type combination may comprise an Ethernet which is full-duplex. Hence, Ethernet-Ethernet between three nodes (considering node A, node B, and node C) offer the same bandwidth between any of the three links. The full duplex may indicate the node's capability to transmit and receive signals at the same time.

Further, Ethernet-wireless combination is also like a full-duplex link type combination. Simultaneous transmission may happen on Ethernet at node A to Ethernet at node B, at the same time as wireless link at node B to wireless link at node C.

Furthermore, Wireless-Wireless is half-duplex link type. In one case, end-to-end bandwidth offer is nearly half of any neighbour link's offer. In another case, end-to-end bandwidth may not be necessarily half. The half-duplex node may either transmit or receive a signal at a given point in time.

In yet another case—Network in Ethernet does not have the concept of one of vicinity or hops in MAC layer, and hence the topology of nodes in the network is virtually a star. Wireless has vicinity due to radio transmit range, and hence wireless link may operate on at least one of a tree and mesh topology.

In one embodiment, the present subject matter illustrates steps performed while transmitting the beacon from one of the node to one or more other nodes in the communication network with multi-back haul links. The transmitting steps may comprise adding one or more bits for each path in the one or more paths while transmitting the beacon. The one or more bits may comprise one of an Ethernet (ETH), Wireless 5G (WL5G), or Wireless 2G (WL2G).

The method may further comprise setting, a selected bit of the one or more bits while transmitting the beacon. Further, the method may comprise carry forwarding the selected bit while transmitting an outgoing beacon to a next node.

In one embodiment, the backhaul bit set may be transmitted for every target seen. Further, one or more beacons in all the outgoing links may have the same best backhaul bit set. Considering FIG. 6B as example, for traffic flowing from node A to node D, wherein node A selects Ethernet as the best backhaul to reach node B, node B selects WL5G as best backhaul to reach C, node C selects WL2G as best backhaul to reach node D. The below details show how the bits will look like on each of the outgoing beacons:

Node C's outgoing beacon on all backhaul interfaces:

| Destination | Bit masks |
| --- | --- |
| B | ETH: 0, WL5G: 1, WL2G: 0 |
| A(reaching through B) | ETH: 1, WL5G: 1, WL2G: 0 |
| D | ETH: 0, WL5G: 0, WL2G: 1 |

Node B's outgoing beacon on all backhaul interfaces:

| Destination | Bitmasks |
| --- | --- |
| A | ETH: 1, WL5G: 0, WL2G: 0 |
| C | ETH: 0, WL5G: 1, WL2G: 0 |
| D(reaching through B) | ETH: 0, WL5G: 1, WL2G: 1 |

Node A's outgoing beacon on all backhaul interfaces:

| Destination | Bitmasks |
| --- | --- |
| B | ETH: 1, WL5G: 0, WL2G: 0 |
| C(reaching through B) | ETH: 1, WL5G: 1, WL2G: 0 |
| D(reaching through B and C) | ETH: 1, WL5G: 1, WL2G: 1 |

In one embodiment, the propagated bits may help the receiving devices know what backhaul links have been used from source to destination.

In one embodiment, considering the example shown in FIG. 6C:

Node B's outgoing beacon on all backhaul interfaces:

| Destination | Bitmasks |
|---|---|
| A | ETH: 0, WL5G: 1, WL2G: 0 |
| C | ETH: 0, WL5G: 1, WL2G: 0 |
| D(reaching through B) | ETH: 0, WL5G: 1, WL2G: 1 |

In one implementation, when node A receives a beacon from node B on WL5G link, node A knows that the same WL5G link is being used for link B to C. Hence, if node A is to use WL5G as the best backhaul link to reach node B, the node A to C throughput will get divided because node AB, node BC are going to use the same half-duplex WL5G link.

In one aspect, the link type effect may provide a bandwidth derived from a minimum formula indicating the minimum of the two or more node capabilities when different backhaul types are participating in the communication between least three nodes from the one or more nodes. In another aspect, the link type effect may provide a bandwidth derived from a division formula indicating that the bandwidth is divided at each link, when one or more half-duplex links are reused in the path from source to target.

In one embodiment, the end-to-end throughput for multi-backhaul links may be calculated by either the minimum formula or the division formula. The minimum formula is used in case if each of the two links do not share a half-duplex medium. The division formula is used in case if any of the links share a half-duplex medium.

The minimum formula is represented by below equation (1)

$$\text{End-to-end throughput} = \min(\text{link } A, \text{link } B) \quad (1)$$

Further, the division formula is represented by below equation (2)

$$\text{End-to-end throughput} = \min(BA, AM)/(1 + \min(BA, AM)/\max(BA, AM)) \quad (2)$$

In one embodiment, the throughput calculation for two links shown in FIG. 6A comprises:

AM indicates prorated A's bandwidth at M based on link AM

BA indicates prorated B's bandwidth at A based on link BA

The below table shows the bandwidth offer:

| Approach name | Link usage | Node M's bandwidth offer to node B |
|---|---|---|
| division | Same half-duplex link getting used as best-backhaul for more than once from B to M | $\min(BA, AM)/(1 + \min(BA, AM)/\max(BA, AM))$ - this is the currently used formula |
| minimum | Either "no repetition of link's usage" or "Link is full-duplex" | $\min(BA, AM)$ |

For example, If node B reaches node A over Ethernet at 1G, node A reaches node M over 5G link at (prorate for RSSI/network load etc.) 700 M, node B to node M offer is 700 M.

In one embodiment, in all interfaces' outgoing beacons of the device, publish bandwidth offer (for corresponding target interface) same as common-table's best interface's bandwidth offer.

For example, if Ethernet is a best interface of the one or more interfaces of the device to reach the target node A, and if the offer is 1 Gbps, then, in 5 g, 2 g outgoing beacons, publish bandwidth offer for node A's 5 g and 2 g interfaces as 1 Gbps. Next hop can be directly node A'5 g or some other in between node's 5 g.

In one embodiment, the FIG. 6B shows the use case for multi-backhaul links in case of no sharing of medium, wherein a source node A, a target node D, one or more intermediate nodes B and C, and multiple backhaul links are connected in the communication network. The FIG. 6B further shows the best/optimum backhaul link selected for the target node D, estimated throughput for each link derived based on one or more of radio capability, PER derived RSSI value, radio free availability for the node and channel free availability for the node. Further, based on the estimated throughput, one link may be selected from the multiple backhaul links for data transfer between the nodes.

Further, each of the outgoing backhaul may publish the best backhaul number only to its neighbour nodes. For example, Node B to Node C. Node B's 2 GHz Wi-Fi interface with 144 Mbps capability will publish the throughput estimate for node C as 866 Mbps considering even the 2 GHz radio packets will get routed only through the best backhaul.

For link AC: link AB uses Ethernet, link BC uses 5 GHz Wi-Fi. Since there is no medium sharing, thus link AC calculation is performed by using the minimum formula.

For link AD: link AC uses both Ethernet and 5 GHz Wi-Fi, link CD uses 2 GHz. Since there is no medium sharing, thus link AD calculation is performed by using the minimum formula.

In one embodiment, the FIG. 6C shows a use case for multi-backhaul links in case of partial sharing of medium.

For link AC: link AB and link BC share the same 5 GHz Wi-Fi medium. Hence, when one link is being used, the other link can not use the medium. Thus, link AC calculation is performed by using the division formula.

For link AD: link AC uses 5 GHz Wi-Fi, and link CD uses 2 GHz Wi-Fi. Since these are different mediums, thus, link AD calculation is performed by using the minimum formula.

In one embodiment, the FIG. 6D shows a use case for multi-backhaul links in case of full sharing of medium. Considering all the nodes are in vicinity to each other:

For Link AC: link AB uses 5 GHz Wi-Fi as best backhaul and link BC also uses 5 GHz Wi-Fi as best backhaul. Since, the medium is shared, thus link AC calculation is performed by using the division formula.

For link AD: link AC uses 5 GHz Wi-Fi as best backhaul and link CD also uses 5 GHz Wi-Fi as best backhaul. Since, the medium is shared, thus link AC calculation is performed by using the division formula.

In one embodiment, the selective score is obtained for each of the use cases of multi-backhaul link explained in FIGS. 6B, 6C, 6D. The method for computing the selective score for each of the multi-backhaul links comprises normalizing the links based on max-throughput capability among the links. The method further comprises using max as a reference. The method further comprises deriving the network score for each of the links. Upon deriving the network score, the final selective score is computed based on the addition of the device score and network score.

In one example, node B's is seeing node A as follows:
prorated throughput estimate on 5 GHz Wi-Fi is 700 Mbps
prorated throughput estimate on Ethernet is 1 Gbps
prorated throughput estimate on 2 GHz Wi-Fiis 120 Mbps
Step 1: Identifying the maximum value of the prorated throughput estimate computed Find Max(1 Gbps,700 Mbps,120 Mbps)=1 Gbps Step 2:
Using the maximum prorated throughput value and deriving the network score:

Ethernet interface network score(out of 100)=1000/1000*100=100

Wireless5G network score=700/1000*100=70

Wireless2G network score=120/1000*100=12

Step 3:
Applying network score and device score to calculate final selective score for each of the links:
Since all nodes are expected to have same device score, and assume if it is 90, final score is calculated as follows:

Final score=(70% of network score)+(30% of device score)

Ethernet=(0.7*100)+(0.9*30)=97

Wireless5G=(0.7*70)+(0.9*30)=78

Wireless2G=(0.7*12)+(0.9*30)=35.4

In one embodiment, the prorated throughput estimate mentioned above in paragraph
is derived based on a set of informative parameters such as radio capability, RSSI, Noise floor, radio load, channel busyness. The calculation of prorated throughput estimated is shown below.

Further, considering the example disclosed above in paragraphs [0046], [0065], and [0066], wherein the node A transmits a beacon to node B. The set of informative parameters are:
Node A and B radio capability—866 Mbps
RSSI of the received beacon——45 dBm
Noise floor at node B——90 dBm
radio load occupancy percentage at node B–80%
channel busyness percentage at node B–75%
The calculation is as follows:
step 1: prorate for RSSI using radio, capability, RSSI, and noise floor:

Signal to noise ratio(SNR)=signal RSSI–noise floor=–45–(–90)=45

Further, the below table may be used to determine "link estimate". The indexes from 0 to 60 in the below table indicate the SNR, and the values at the indexes indicate the link estimate.

0.1, 0.2, 0.3, 0.4, 0.5, /* 0 */
0.6, 0.7, 0.8, 0.9, 1.0, /* 5 */
1.2, 1.4, 1.6, 1.8, 2.0, /* 10*/
2.5, 3.5, 4.5, 5.5, 6.5, /* 15*/

-continued 8.0, 10.0, 12.0, 14.0, 16.0, /* 20 */
18.0, 21.4, 24.8, 28.2, 31.6, /* 25 */
35.0, 37.0, 39.0, 41.0, 43.0, /* 30 */
45.0, 48.0, 51.0, 54.0, 57.0, /* 35 */
60.0, 62.0, 64.0, 66.0, 68.0, /* 40 */
70.0, 73.0, 76.0, 79.0, 82.0, /* 45 */
85.0, 87.2, 89.4, 91.6, 93.8, /* 50 */
96.0, 96.6, 97.2, 97.8, 98.4, /* 55 */
99.0 /* 60 */

Thus, value at index 45 is 70.
Hence, link estimate=70% (it changes for a different RSSI and/or different noise floor)
prorate for RSSI=866*70/100=606.2 Mbps
Step 2: prorate for radio load:
Sine, the radio is already occupied by 80%. Thus, free percentage=20%
Hence, prorate for radio load=606.2*20/100=121.24 Mbps
Step 3: prorate for channel busyness:
Since, channel is busy for 75%. Thus, free channel time=25%
Hence, prorate for channel busyness=121.24*25/100=30.31 Mbps
Prorated throughput estimate for link AB is 30.31 Mbps
The above steps demonstrate how every link's estimate is calculated.

Figure 7:
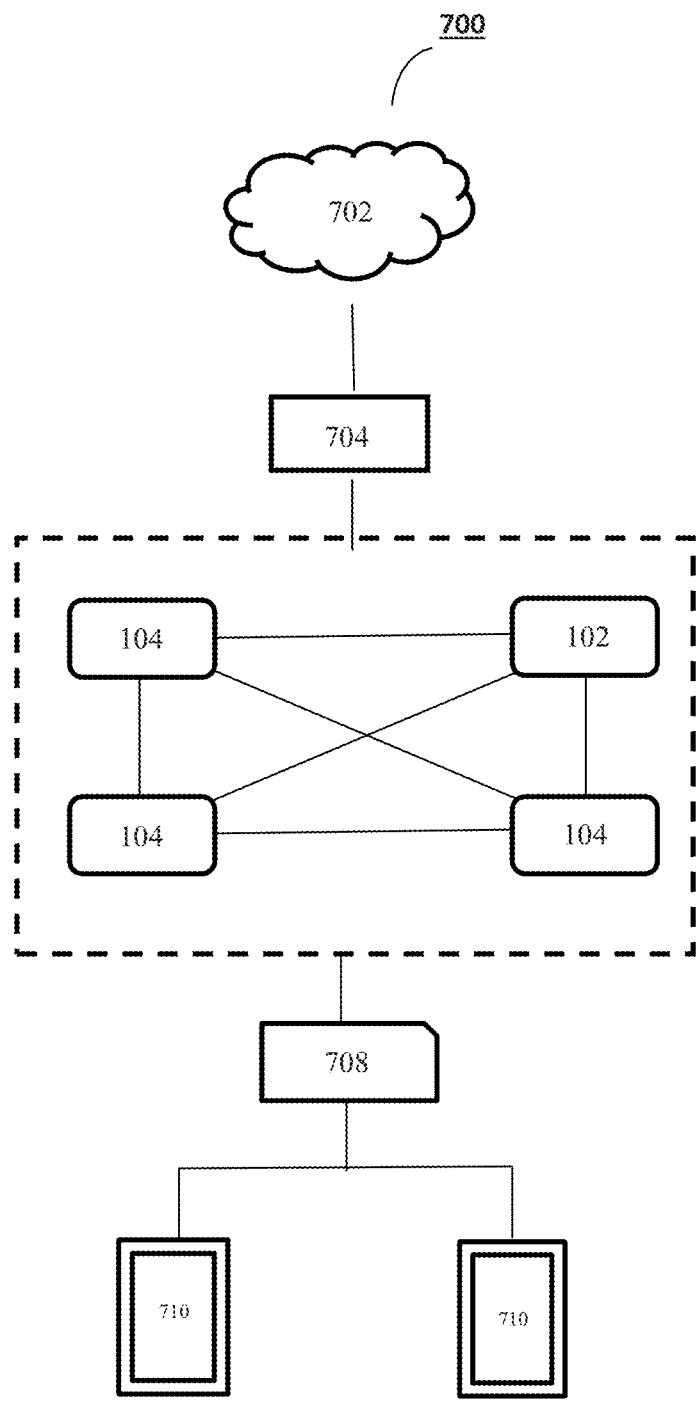
FIG. 7 illustrates a system 700 for selecting a path in a communication network using the method 100, in accordance with an embodiment of the present subject matter.

Referring now to FIG. 7, a system 700 for selecting the path in the communication network using the method 100 is described, in accordance with an embodiment of the present subject matter.

In one embodiment, the communication network comprises the mesh network. The mesh network may comprise of one or more interconnected devices or nodes 104. Further, one or more mesh routers associated with the one or more nodes 104, forward traffic to and from one or more gateways 704 connected to the Internet 702. The one or more nodes 104 may communicate with each other and route data to/from one or more mesh clients 710 such as laptops, cell phones, and other wireless devices through one or more access points such as 708.

In one embodiment, the one or more nodes 104 may act as the mesh router to route data to a target node. In order to reach the target node 102, the one or more nodes 104 may select a path. For selecting the path, initially, a device connected to a target node 102 may transmit a beacon, to the one or more nodes 104. The beacon comprises a set of informative parameters.

In one embodiment, the set of informative parameters may comprise at least one of an address of the target node 102 (6 bytes), estimated throughput to reach the target node 102 (2 bytes), device score of the nodes (1 byte), capability of the target node 102 (1 byte), and next hop node address towards the target node 102 (6 bytes). Each node may advertise the one or more parameters to reach the target node 102. In one example, if there are 10 nodes in the mesh network, then each device's beacon will have the above set of 16 bytes advertised for each of the other 9 devices.

In another embodiment, the set of informative parameters may further comprise if the device is operated through one of a battery or mains power, remaining battery minutes in case the device is operated by the battery, charge status of the battery of the device, current free CPU percentage for the device, current free memory percentage for the device.

In another embodiment, the set of informative parameters may comprise a link type effect due to multi-backhaul links between two or more nodes in the communication network. The multi-backhaul links may indicate a combination of backhaul link such as one or more of wired links, wireless links.

Further, each node 104 from the one or more nodes 104 in the communication network may be configured to calculate a selective score towards one more paths to be selected for reaching the target node 102 in the communication network. The selective score may comprise a dynamic score for each parameter in the set of informative parameters.

In one embodiment, the system 700 provides selective score and end-to-end throughput calculation for a multi-hop path in the communication network.

Furthermore, each node 104 may identify a target path from the one or more paths. The target path may be a path having a highest value of the selective score as compared to selective score for other paths in the one or more paths.

Furthermore, the identified target path may be selected from the one or more paths for reaching the target node 102.

Exemplary embodiments discussed above may provide certain advantages. Though not required to practice aspects of the disclosure, these advantages may include those provided by the following features.

Some embodiments of the system and the method may be configured to accurately select a path in a communication network for data transfer by considering network metrics, device metrics as well as application metrics.

Some embodiments of the system and the method may enable dynamic selection of path in the communication network in case of moving nodes.

Some embodiments of the system and the method may reduce additional airtime overhead for path finding.

Some embodiments of the system and the method may reduce airtime penalty.

Some embodiments of the system and the method may reduce path adaptation latency.

Some embodiments of the system and the method may consider multi-backhaul aspect for path selection.

Although implementations for methods and systems for selecting a path in a communication network, have been described in language specific to structural features and/or methods, it is to be understood that the appended claims are not necessarily limited to the specific features or methods described. Rather, the specific features and methods are disclosed as examples of implementations for selecting a path in a communication network.

The invention claimed is:

1. A method for selecting a path in a communication network, the method comprising:
    transmitting, through a device connected to a target node, a beacon, to one or more nodes in the communication network, wherein the beacon comprises a set of informative parameters;
    calculating, by each node, a selective score for one or more paths to be selected for reaching the target node in the communication network, wherein the selective score comprises a dynamic score for each parameter in the set of informative parameters;
    identifying, by each node, a target path from the one or more paths, wherein the target path comprises a path having a highest selective score as compared to selective score for other paths in the one or more paths; and
    selecting, by each node, the target path from the one or more paths for reaching the target node.

2. The method as claimed in claim 1, wherein the set of informative parameters comprise at least one of an address of the target node, end-to-end throughput to reach the target node, device score for the one or more nodes, capability of the target node, and next hop node address towards the target node, wherein the set of informative parameters comprise when the device is operated through one of a battery or main power, remaining battery minutes in case the device is operated by the battery, charge status of the battery of the device, current free CPU percentage for the device, and current free memory percentage for the device.

3. The method as claimed in claim 2, wherein the capability of the target node is determined based on a Received Signal Strength Indicator (RSSI) value associated with the beacon transmitted from the device.

4. The method as claimed in claim 1, wherein the calculating is performed by using at least one of device metrics, network metrics, and application metrics, wherein the device metrics indicates a device score, and wherein the device metrics comprises one or more of remaining battery time, current free CPU percentage, and current free memory associated with the device, and wherein the application metrics indicates an application score used for calculating the selective score, and wherein the application metrics comprises a type of application.

5. The method as claimed in claim 4, wherein the network metrics indicates a network score, and wherein the network metrics comprises one or more of a Packet Error Rate (PER) associated with each path from the one or more paths, number of mesh hops required to reach the target node, current traffic load on one or more hop nodes, channel noise on the one or more hop nodes, channel noise floor, and network latency.

6. The method as claimed in claim 1, wherein the calculating comprises:
    calculating the selective score according to the set of informative parameters comprising when the device is operated through one of a battery or main power, remaining battery minutes in case the device is operated by the battery, charge status of the battery of the device, current free CPU percentage for the device, and current free memory percentage for the device, in case the target node is not in the communication network.

7. The method as claimed in claim 1, wherein the calculating comprises:
    searching, by the respective node, an address of the target node in the communication network matching with a target address based on the set of informative parameters;
    calculating, by the respective node, an end-to-end throughput value in case of the matching; and
    calculating the selective score by using the end-to-end throughput value.

8. The method as claimed in claim 7, wherein the end-to-end throughput value is calculated by calculating throughput value for two links, and wherein the throughput value is calculated according to a link type between at least three nodes from the one or more nodes.

9. The method as claimed in claim 1, wherein the selective score comprises at least one of a device score, a network score, and an application score, and wherein the selective score is computed by dynamically assigning one or more weights to each of the device score, the network score, and the application score based on one or more environmental factors using machine learning technique, and wherein the selective score is computed based on adding at least two of the device score, the network score, and the application score.

10. The method as claimed in claim 1, wherein the set of informative parameters further comprises a link type effect due to multi-backhaul links between two or more nodes in the communication network, wherein the multi-backhaul links indicate a combination of backhaul links comprising one or more of wired links, and wireless links.

11. The method as claimed in claim 10, wherein the link type effect provides one of a bandwidth derived from a minimum of two or more node capabilities when different backhaul types are participating in a communication between at least three nodes from one or more nodes indicating a full-duplex, or a bandwidth divided at each wireless link, when one or more half-duplex links are reused in a path from a source to the target node, and wherein the full-duplex indicates the at least three node's capability to transmit and receive at the same time, and wherein a half-duplex node either transmits or receives at a given point in time.

12. The method as claimed in claim 1, wherein the transmitting comprises:
adding one or more bits for each path in the one or more paths while transmitting the beacon, wherein the one or more bits comprises one of an Ethernet (ETH), Wireless 5G (WL5G), or Wireless 2G (WL2G);
setting a selected bit of the one or more bits while transmitting the beacon; and
carry forwarding the selected bit while transmitting an outgoing beacon to a next node.

13. The method as claimed in claim 1, wherein the calculating comprises:
normalizing, multi-backhaul links, based on max-possible offer between the multi-backhaul links;
prorating each multi-backhaul link's offer based on link parameters; and
calculate the selective score based on normalization of the multi-backhaul links.

14. The method as claimed in claim 1, wherein an end-to-end throughput and the selective score is computed for a multi-hop path in the communication network, wherein the communication network comprises a mesh network.

15. A system for selecting a path in a communication network, the system comprising:
a device connected to a target node, for transmitting a beacon, to one or more nodes in the communication network, wherein the beacon comprises a set of informative parameters;
the one or more nodes in the communication network, wherein each node is configured to:
calculate a selective score for one or more paths to be selected for reaching the target node in the communication network, wherein the selective score comprises a dynamic score for each parameter in the set of informative parameters;
identify a target path from the one or more paths, wherein the target path is a path having a highest selective score as compared to selective score for other paths in the one or more paths; and
select the target path from the one or more paths for reaching the target node.

16. The system as claimed in claim 15, wherein the set of informative parameters comprise at least one of an address of the target node, end-to-end throughput to reach the target node, device score for the one or more nodes, capability of the target node, and next hop node address towards the target node, and wherein the set of informative parameters comprise when the device is operated through one of a battery or main power, remaining battery minutes in case the device is operated by the battery, charge status of the battery of the device, current free CPU percentage for the device, and current free memory percentage for the device.

17. The system as claimed in claim 16, wherein the capability of the target node is determined based on a Received Signal Strength Indicator (RSSI) value associated with the beacon transmitted from the device.

18. The system as claimed in claim 15, wherein each of the one or more nodes is configured to:
calculate the selective score by using at least one of device metrics, network metrics, and application metrics, and wherein the device metrics indicates a device score, and wherein the device metrics comprises one or more of remaining battery time, current free CPU percentage, and current free memory associated with the device.

19. The system as claimed in claim 18, wherein the network metrics indicates a network score, and wherein the network metrics comprises one or more of a Packet Error Rate (PER) associated with each path from the one or more paths, number of mesh hops required to reach the target node, current traffic load on one or more hop nodes, channel noise on the one or more hop nodes, channel noise floor, and network latency.

20. The system as claimed in claim 18, wherein the application metrics indicates an application score used for calculating the selective score, and wherein the application metrics comprises a type of application.

21. The system as claimed in claim 15, wherein each of the one or more nodes is configured to:
calculate the selective score according to the set of informative parameters comprising one of, when the device is operated through one of a battery or main power, remaining battery minutes in case the device is operated by the battery, charge status of the battery of the device, current free CPU percentage for the device, and current free memory percentage for the device, in case the target node is not in the communication network.

22. The system as claimed in claim 15, wherein each of the respective node is configured to:
search, by the respective node, an address of the target node in the communication network matching with a target address based on the set of informative parameters;
calculate, by the respective node, an end-to-end throughput value in case of the matching; and
calculate the selective score by using the end-to-end throughput value.

23. The system as claimed in claim 22, wherein the end-to-end throughput value is calculated by calculating throughput value for two links, and wherein the throughput value is calculated according to a link type between at least three nodes from the one or more nodes.

24. The system as claimed in claim 15, wherein the selective score comprises at least one of a device score, a network score, and an application score, and wherein the selective score is computed by dynamically assigning one or more weights to each of the device score, the network score, and the application score based on one or more environmental factors using machine learning technique, and wherein the selective score is computed based on adding at least two of the device score, the network score, and the application score.

25. The system as claimed in claim 15, wherein the set of informative parameters comprises a link type effect due to multi-backhaul links between two or more nodes in the communication network, wherein the multi-backhaul links indicate a combination of backhaul links comprising one or more of wired links, and wireless links.

26. The system as claimed in claim 25, wherein the link type effect provides one of a bandwidth derived from a minimum of two or more node capabilities when different backhaul types are participating in a communication between at least three nodes from one or more nodes indicating a full-duplex, or a bandwidth divided at each wireless link, when one or more half-duplex links are reused in a path from a source to the target node, and wherein the full-duplex indicates the at least three node's capability to transmit and receive at the same time, and wherein a half-duplex node either transmits or receives at a given point in time.

27. The system as claimed in claim 15, wherein the device is configured to:
   Add one or more bits for each path in the one or more paths while transmitting the beacon, wherein the one or more bits comprises one of an Ethernet (ETH), Wireless 5G (WL5G), or Wireless 2G (WL2G);
   set a selected bit of the one or more bits while transmitting the beacon; and
   carry forward the selected bit while transmitting an outgoing beacon to a next node.

28. The system as claimed in claim 15, wherein each of the one or more nodes is configured to:
   normalize, links, based on max-possible offer between the multi-backhaul links;
   prorate each multi-backhaul link's offer based on link parameters; and
   calculate the selective score based on normalization the of the multi-backhaul links.

29. The system as claimed in claim 15, wherein the one or more nodes are configured to:
   compute an end-to-end throughput and the selective score for a multi-hop path in the communication network, wherein the communication network comprises a mesh network.

* * * * *